(12) United States Patent
Marzetta et al.

(10) Patent No.: US 8,143,746 B2
(45) Date of Patent: Mar. 27, 2012

(54) AUTOMATIC TUNING FOR WIRELESS POWER TRANSFER

(75) Inventors: Thomas L. Marzetta, Summit, NJ (US); Michael G. Zierdt, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 179 days.

(21) Appl. No.: 12/642,920

(22) Filed: Dec. 21, 2009

(65) Prior Publication Data

US 2011/0148215 A1 Jun. 23, 2011

(51) Int. Cl.
*H01F 27/42* (2006.01)
*H01F 37/00* (2006.01)
*H01F 38/00* (2006.01)

(52) U.S. Cl. ...................................................... 307/104
(58) Field of Classification Search .................. 307/104, 307/149; 455/77; 343/745
See application file for complete search history.

(56) References Cited

U.S. PATENT DOCUMENTS

2010/0141042 A1* 6/2010 Kesler et al. .................. 307/104
* cited by examiner

*Primary Examiner* — Jared Fureman
*Assistant Examiner* — Carlos Amaya
(74) *Attorney, Agent, or Firm* — Mendelsohn, Drucker & Associates, P.C.; Craig M. Brown; Steve Mendelsohn (57) ABSTRACT

In one embodiment, a wireless power transfer system has a wireless power transmitter and receiver. The transmitter has a transmitting resonant circuit that resonates at a first frequency and a signal generator that generates a signal at a second frequency. The transmitter also has a power detector that measures reflected power at the transmitting resonant circuit, and an auto-tuner that generates transmitter tuning parameters for adjusting the first and second frequencies to reduce reflected power. The receiver has a receiving resonant circuit that resonates at a third frequency based on a receiver tuning parameter. The receiver tuning parameter is generated by a power detector that measures power generated at the receiving resonant circuit, and an auto-tuner that generates the receiver tuning parameter to increase the load power.

23 Claims, 4 Drawing Sheets

AUTOMATIC TUNING FOR WIRELESS POWER TRANSFER

BACKGROUND OF THE INVENTION

1. Field of the Invention

The present invention relates to wireless power transmission, and, in particular, to tuning of wireless power transmission devices.

2. Description of the Related Art

In 2007, a group at the Massachusetts Institute of Technology (MIT) investigated the feasibility of using resonant circuits to transmit power wirelessly. During the investigation, the group discovered that power can be transferred over mid-range distances that are up to several times larger than the diameters of each of the transmitting and receiving devices. To validate this discovery, the MIT group built a wireless power transmission system having a transmission coil and a receiving coil, both of which were 0.6 meters in diameter. The group then demonstrated that the wireless power transmission system was capable of transmitting 60 watts of power at a frequency of 10.0 MHz over a distance in excess of two meters with an efficiency of approximately 40 percent.

Wireless power transmission in the MIT demonstration was based on the principles of electromagnetic resonant coupling and evanescent coupling (coupling accomplished through the overlap of the non-radiative near-fields of two objects). To obtain a range of approximately two meters or more, there is typically a relatively small transformer coupling coefficient (e.g., <0.2%) between the transmission coil and the reception coil as opposed to a relatively large transformer coupling coefficient (e.g., >95%) in well-designed transformers. To compensate for this relatively small coupling coefficient, the wireless power transmission system may be operated using (i) RF frequencies (e.g., 5-20 MHz), (ii) transmission and reception coils that have relatively high quality (Q) factors, and (iii) resonance in the transmitting and receiving circuits. A discussion of the MIT investigation and demonstration may be found in Aristeidis Karalis, et al., "Efficient Wireless Non-Radiative Mid-Range Energy Transfer," Annals of Physics 323, pgs. 34-48, 2008, and André Kurs, et al., "Wireless Power Transfer via Strongly Coupled Magnetic Resonances," Science Express, Vol. 317, No. 5834, pgs. 83-86, July 2007, the teachings all of which are incorporated herein by reference in their entirety.

SUMMARY OF THE INVENTION

In one embodiment, the present invention is a device for a wireless power transfer system, the system having a wireless power transmitter (TX) and a wireless power receiver (RX). The wireless power transmitter comprises (i) a TX resonant circuit that resonates at a TX resonant frequency, and (ii) a signal generator that applies a generator signal having a generator frequency to the TX resonant circuit. The wireless power receiver comprises an RX resonant circuit that resonates at an RX resonant frequency. At least one of the wireless power transmitter and the wireless power receiver comprises a power detector that measures power in the corresponding resonant circuit. Further, at least one of the wireless power transmitter and the wireless power receiver comprises an auto-tuner that generates at least one tuning parameter (e.g., $s_{t,1}$, $s_{t,2}$, $s_r$) based on the measured power. The at least one tuning parameter is used to adjust at least one of the generator frequency, the TX resonant frequency, and the RX resonant frequency. The device is one of the wireless power transmitter and the wireless power receiver, and the device comprises at least one of the power detector and the auto-tuner.

In another embodiment, the present invention is the wireless power transfer system described above comprising the wireless power transmitter and the wireless power receiver.

In yet another embodiment, the present invention is a method for tuning a device in a wireless power transfer system, the system having a wireless power transmitter and a wireless power receiver. The wireless power transmitter comprises (i) a TX resonant circuit that resonates at a TX resonant frequency, and (ii) a signal generator that applies a generator signal having a generator frequency to the TX resonant circuit. The wireless power receiver comprises an RX resonant circuit that resonates at an RX resonant frequency. The method comprises (a) detecting power in at least one of the wireless power transmitter and the wireless power receiver, (b) generating at least one tuning parameter based on the measured power, and (c) adjusting at least one of the generator frequency, the TX resonant frequency, and the RX resonant frequency based on the at least one tuning parameter.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
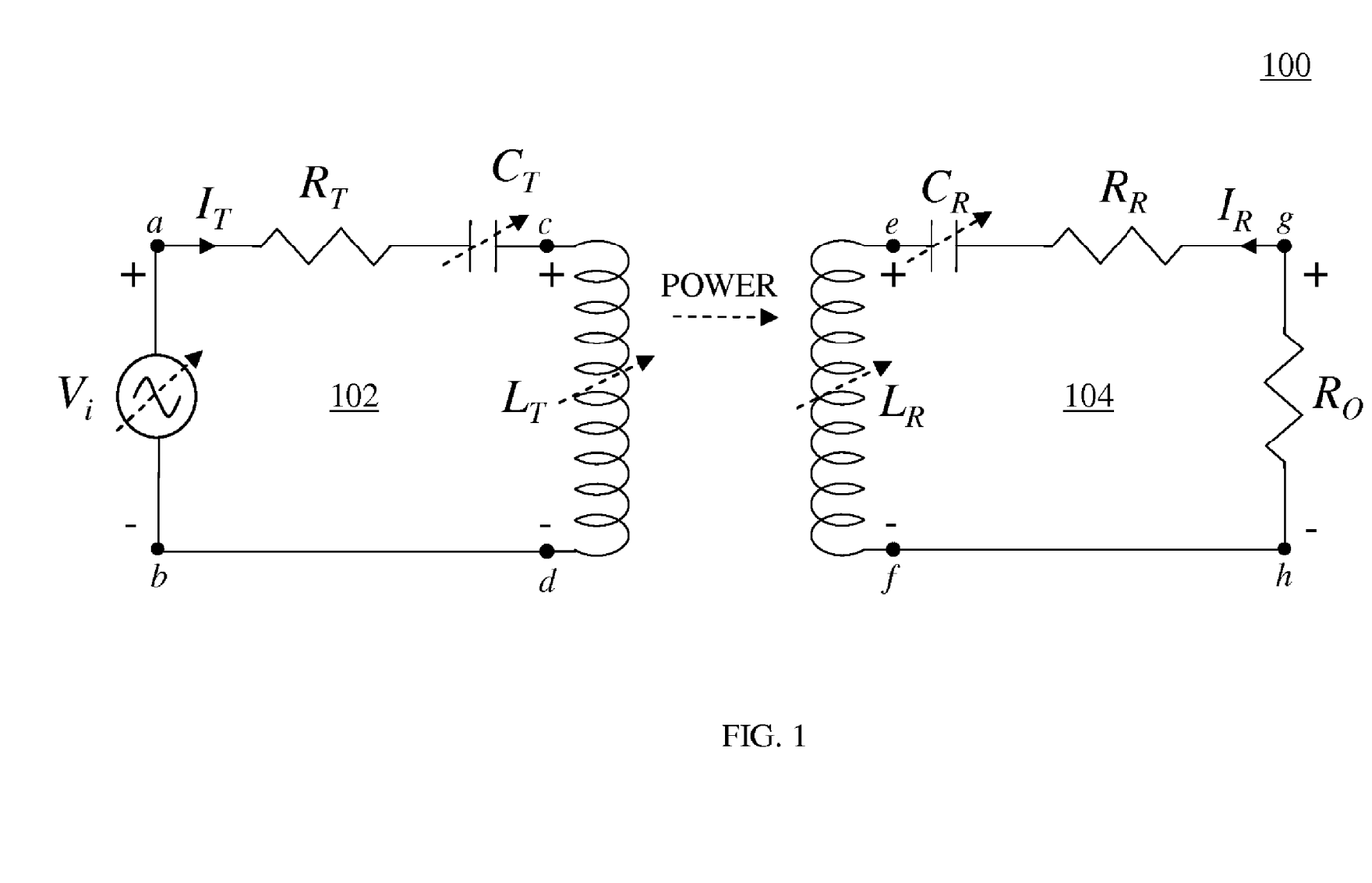
FIG. 1 shows a simplified circuit model of a wireless power transfer system according to one embodiment of the present invention.

FIG. 1 shows a simplified circuit model of a wireless power transfer system 100 according to one embodiment of the present invention. Wireless power transfer system 100 has transmitting circuit 102 and receiving circuit 104. Transmitting circuit 102 has inductance $L_T$, capacitance $C_T$, and resistance $R_T$ that are arranged in series to form a resonant circuit that is driven by an AC signal generator $V_i$ to resonate at a desired transmitter frequency $\omega_T$. Inductance $L_T$ is associated with an actual inductor, and series capacitance $C_T$ can either be associated with a parasitic capacitance of inductor $L_T$, with an actual capacitor, or both. Series resistance $R_T$ is the sum of two terms comprising the actual resistance $R_{T\Omega}$ of inductor $L_T$ plus the radiation resistance $R_{Tr}$ of inductor $L_T$, as shown in Equation (1) below:

$$R_T = R_{T\Omega} + R_{Tr} \quad (1)$$

Receiving circuit 104 has inductance $L_R$, capacitance $C_R$, resistance $R_R$, and load resistance $R_O$, which are arranged in series to form a resonating circuit that resonates at a desired receiver frequency $\omega_R$. Inductance $L_R$ is associated with an actual inductor, and series capacitance $C_R$ can either be associated with a parasitic capacitance of inductor $L_R$, with an actual capacitor, or both. Load resistance $R_O$ can be associated with any suitable device that requires power to operate, such as a cellular phone or mp3 player. Further, similar to series resistance $R_T$, series resistance $R_R$ is the sum of two terms comprising the actual resistance $R_{R\Omega}$ of inductor $L_R$ plus the radiation resistance $R_{Rr}$ of inductor $L_R$, as shown in Equation (2) below:

$$R_R = R_{R\Omega} + R_{Rr} \quad (2)$$

Power transmission between transmitting circuit 102 and receiving circuit 104 is based on the principle of resonant coupling. When transmitting circuit 102, the frequency of signal generator $V_i$, and receiving circuit 104 resonate at substantially identical frequencies, transmitting circuit 102 and receiving circuit 104 tend to couple together, while interacting weakly with other objects that do not resonate at the same frequency. For optimal power transfer, the frequency of signal generator $V_i$, the resonant frequency of transmitting circuit 102, and the resonant frequency of receiving circuit 104 should all be the same. Power transmission between transmitting circuit 102 and receiving circuit 104 may be optimized by designing the resonant frequency $\omega_T$ of transmitting circuit 102, the frequency of signal generator $V_i$, and the resonant frequency $\omega_R$ of receiving circuit 104 to be as close to one another as possible (i.e., $\omega_T = \omega_R =$ frequency of $V_i$). However, in operation, the resonant frequency $\omega_T$ of transmitting circuit 102 may be perturbed by, for example, objects close to transmitting circuit 102, such that transmitter resonant frequency $\omega_T$ deviates from receiver resonant frequency $\omega_R$ and the frequency of signal generator $V_i$. Similarly, receiver resonant frequency $\omega_R$ may be perturbed by, for example, objects close to receiving circuit 104 such that receiver resonant frequency $\omega_R$ deviates from transmitter resonant frequency $\omega_T$ and the frequency of signal generator $V_i$. Further, the frequency of signal generator $V_i$ may drift such that it deviates from transmitter resonant frequency $\omega_T$ and receiver resonant frequency $\omega_R$.

To counteract deviations of resonant frequencies $\omega_T$ and $\omega_T$ and the frequency of signal generator $V_i$, one or more of the components of transmitting circuit 102 and receiving circuit 104 may be tuned (i.e., adjusted) as indicated by the dashed arrows through the components in FIG. 1. For example, when resonant frequencies $\omega_T$ and $\omega_R$ deviate from one another, the capacitance $C_T$ and/or inductance $L_T$ of transmitting circuit 102 may be tuned appropriately to bring transmitter resonant frequency $\omega_T$ into alignment with receiver resonant frequency $\omega_R$ (i.e., $\omega_T = \omega_R$). When the frequency of signal generator $V_i$ deviates from resonant frequencies $\omega_T$ and/or $\omega_R$, the frequency of signal generator $V_i$ may be tuned appropriately to bring it into alignment with resonant frequencies $\omega_T$ and/or $\omega_R$. To bring receiver resonant frequency $\omega_R$ into alignment with transmitter resonant frequency $\omega_T$ and/or the frequency of signal generator $V_i$, the capacitance $C_R$ and/or inductance $L_R$ of receiving circuit 104 may be tuned appropriately. Note that the resonant frequency $\omega_T$ of transmitting circuit 102, the frequency of signal generator $V_i$ and/or the resonant frequency $\omega_R$ of receiving circuit 104 may be tuned to bring them into alignment with one another or into alignment with a desired operating resonating frequency $\omega_{des}$ (i.e., $\omega_T = \omega_R =$ frequency of $V_i = \omega_{des}$). Preferably, the components of transmitting circuit 102 and receiving circuit 104, and the frequency of signal generator $V_i$ are tuned automatically, without user intervention.

Figure 2:
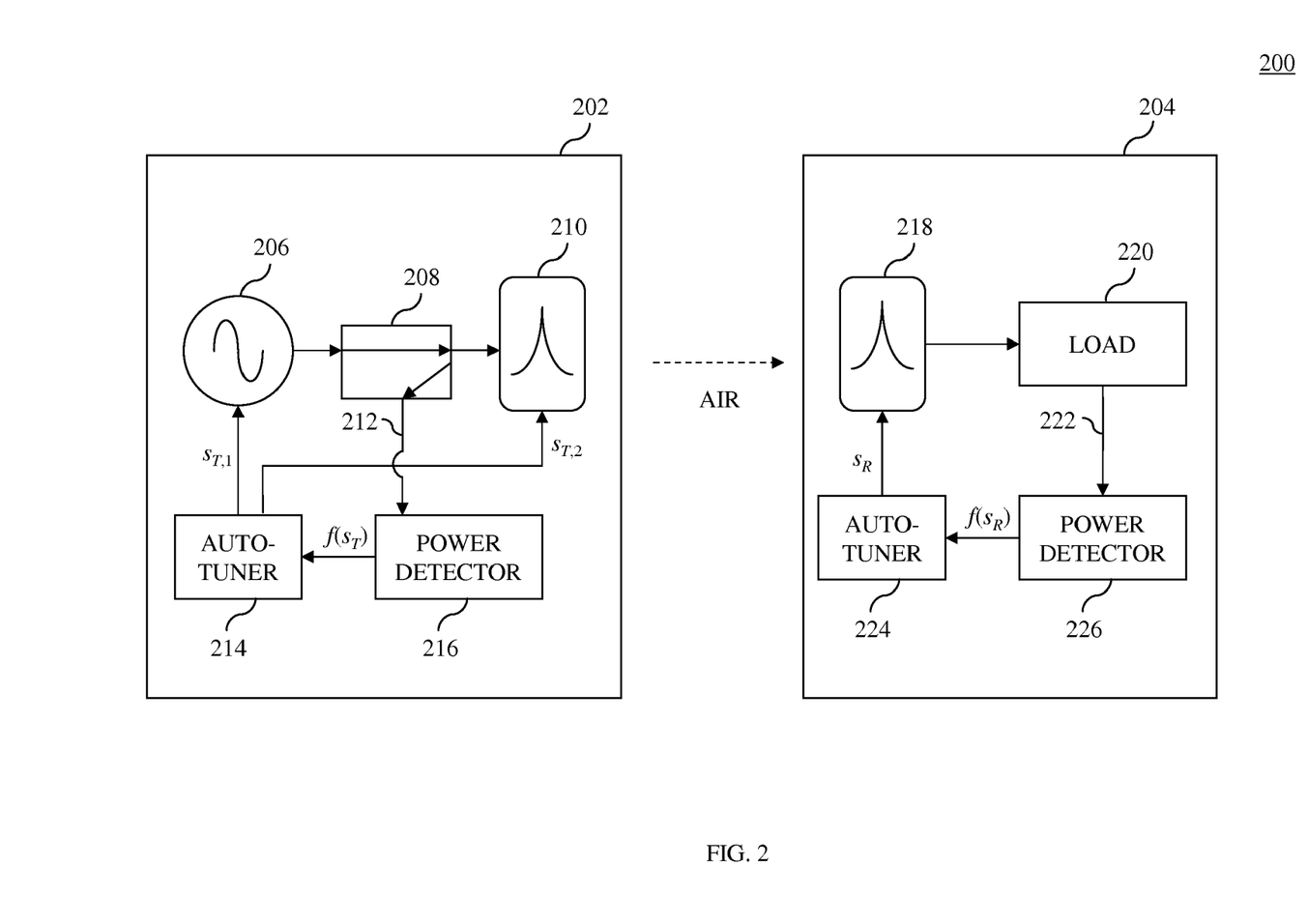
FIG. 2 shows a simplified block diagram of a wireless power transfer system employing auto-tuning according to one embodiment of the present invention.

FIG. 2 shows a simplified block diagram of a wireless power transfer system 200 employing automatic tuning according to one embodiment of the present invention. Wireless power transfer system 200 has wireless power transmitter 202 and wireless power receiver 204. Wireless power transmitter 202 has transmitting (TX) resonant circuit 210, which may be implemented using any suitable resonating circuit, such as transmitting resonant circuit 102 in FIG. 1, and signal generator 206, which may be implemented using, for example, an AC signal generator such as signal generator $V_i$ in FIG. 1. In general, wireless power transmitter 202 attempts to minimize power reflected back from transmitting resonant circuit 210 by (i) setting the frequency of signal generator 206 and (ii) tuning the resonant frequency of transmitting resonant circuit 210. This may be accomplished by setting the frequency of signal generator 206 first, and tuning transmitting resonant circuit 210 to the desired resonance next, or vice-versa.

Figure 3:
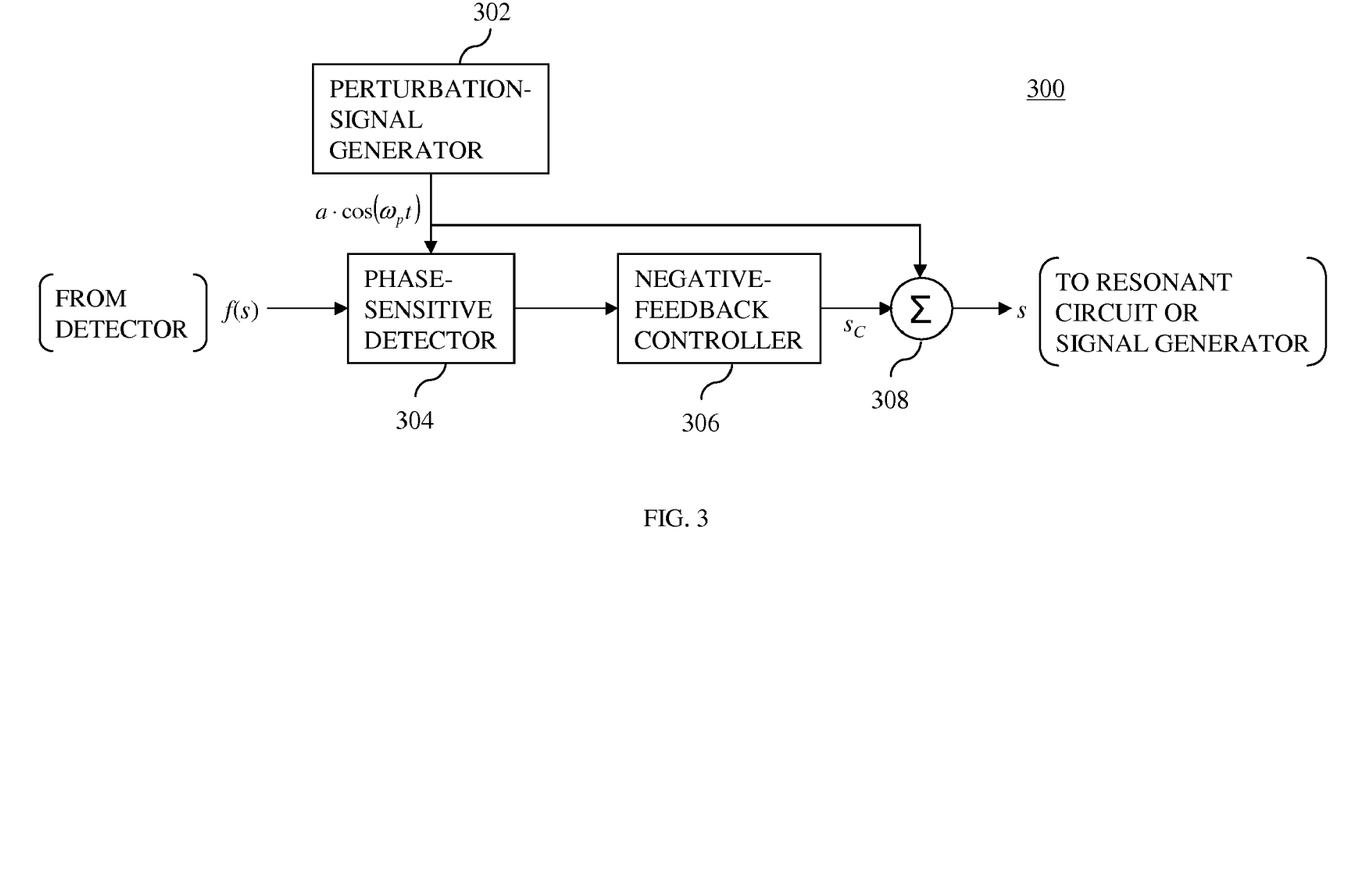
FIG. 3 shows a simplified block diagram of an analog automatic tuner according to one embodiment of the present invention that may be used to implement the automatic tuners in FIG. 2.
Figure 4:
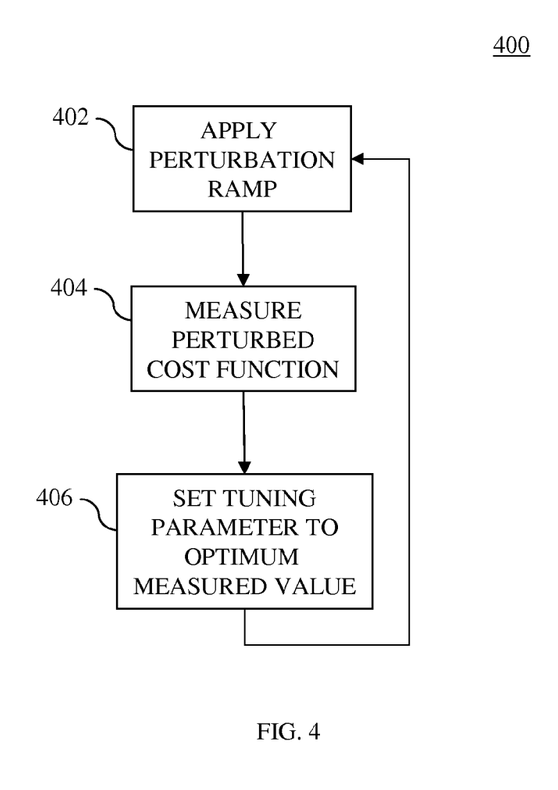
FIG. 4 shows a simplified flow diagram for a digital automatic tuner according to one embodiment of the present invention that may be used to implement the automatic tuners in FIG. 2.

To minimize reflected power, wireless power transmitter 202 employs coupler 208, power detector 216, and automatic tuner (auto-tuner) 214. Coupler 208 receives a signal (e.g., voltage) reflected back from transmitting resonant circuit 210 and provides the signal 212 (e.g., voltage) to power detector 216. According to some embodiments, wireless power transmitter may digitize signal 212. Power detector 216 squares the magnitude of the signal to obtain a reflected power measurement. The reflected power measurement may be smoothed to obtain cost function $f(s_T)$ as shown in Equation (3) below:

$$f(s_T) = \int_{t-(T_s/2)}^{t+(T_s/2)} |v_u|^2 \, du \quad (3)$$

where $v_u$ is the signal provided by coupler 208, u is a unit of time, and $T_s$ is the desired smoothing interval. Auto-tuner 214 receives cost function $f(s_T)$ from power detector 216 and automatically adjusts first and second transmitter tuning parameters $s_{T,1}$ and $s_{T,2}$ to minimize the cost function (i.e., reflected power) of Equation (3). Auto-tuner 214, which is described in further detail below in relation to FIGS. 3 and 4, is an adaptive feedback device in that (i) adjusts tuning parameters $s_{T,1}$ and $s_{T,2}$, (ii) observes the changes that results in the cost function of Equation (3) due to the adjusted tuning parameters, and (iii) performs further adjustment of tuning parameters $s_{T,1}$ and $s_{T,2}$ as appropriate to reduce the cost function. As described below, auto-tuner 214 may be implemented in analog circuitry or auto-tuner 214 may be implemented digitally.

Tuning parameter $s_{T,1}$ is provided to signal generator 206 to adjust the frequency of the generator signal, and tuning parameter $s_{T,2}$ is provided to transmitter resonant circuit 210 to adjust transmitter resonant frequency $\omega_T$ of transmitter resonant circuit 210. Adjustment of transmitter resonant frequency $\omega_T$ may be accomplished by any suitable method such as by adjusting the capacitance (e.g., $C_T$) and/or inductance (e.g., $L_T$) of transmitter resonant circuit 210. For example, if capacitance $C_T$ in FIG. 1 is associated with a variable capacitor (i.e., varactor), then tuning parameter $s_T$ may be a voltage that is supplied to the varactor to control capacitance $C_T$ of the varactor.

Wireless power receiver 204 has receiving (RX) resonant circuit 218 which provides power to load 220. Receiving resonant circuit 218 may be implemented using any suitable resonating circuit, such as receiving resonant circuit 104 in FIG. 1. Load 220 may be any suitable device that requires power to operate, such as a cellular phone or mp3 player. Load 220 may also be a battery that is charged for subsequent powering of a device. In general, wireless power receiver 204 attempts to maximize power transfer to load 220 by tuning the resonant frequency of receiving resonant circuit 218. This may be accomplished before or after wireless power transmitter 202 sets the frequency of signal generator 206 and/or tunes the resonant frequency of transmitting resonant circuit 210.

To maximize power transfer to load 220, wireless power receiver 204 employs power detector 226 and auto-tuner 224. Power detector 226 receives a signal 222 (e.g., voltage) received at load 220 and squares the magnitude of the signal to obtain a measurement of power at the load. According to some embodiments, wireless power receiver 204 may digitize signal 222. The load power measurement may be smoothed to obtain cost function $f(s_R)$ as shown in Equation (4) below:

$$f(s_R) = \int_{t-(T_R/2)}^{t+(T_R/2)} |v_u|^2 \, du \tag{4}$$

where $v_u$ is the signal received at load 220, u is a unit of time, and $T_R$ is the desired smoothing interval. Note that this operation could be implemented digitally by digitizing $v_t$. Auto-tuner 224 receives cost function $f(s_R)$ from power detector 226 and automatically adjusts receiver tuning parameter $s_R$ to minimize the cost function (i.e., power at load 220) of Equation (6). Similar to auto-tuner 214, auto-tuner 224 is an adaptive feedback device in that (i) adjusts tuning parameter $s_R$, (ii) observes the changes that results in the cost function of Equation (6) due to the adjusted tuning parameter, and (iii) performs further adjustment of tuning parameter $s_R$ as appropriate to reduce the cost function.

Tuning parameter $s_R$ is provided to receiver resonant circuit 218 to adjust receiver resonant frequency $\omega_R$ of receiver resonant circuit 218. Adjustment of receiver resonant frequency $\omega_R$ may be accomplished by any suitable method such as by adjusting the capacitance (e.g., $C_R$) and/or inductance (e.g., $L_R$) of receiver resonant circuit 218. Similar to wireless power transmitter 202, capacitance $C_R$ in FIG. 1 may be associated with a varactor, and tuning parameter $s_R$ may be a voltage that is supplied to the varactor that controls capacitance $C_R$ of the varactor.

FIG. 3 shows a simplified block diagram of an analog auto-tuner 300 according to one embodiment of the present invention that may be used to implement auto-tuners 214 and 224 in FIG. 2. In general, auto-tuner 300 receives cost function $f(s)$ from a detector, and determines a value of the tuning parameter s that maximizes cost function $f(s)$. Note that cost function $f(s)$ may be either a transmitter cost function $f(s_T)$ or a receiver cost function $f(s_R)$ as shown in FIG. 2 depending on whether auto-tuner 300 is implemented in wireless power transmitter 202 or wireless power receiver 204. Further, tuning parameter s may be either a transmitter tuning parameter $s_{T,1}$ or $s_{T,2}$ or a receiver tuning parameter $s_R$ depending on whether auto-tuner 300 is implemented in wireless power transmitter 202 or wireless power receiver 204. For the following discussion, cost function $f(s)$ and tuning parameter s will be discussed in generic terms, rather than in terms of a specific transmitter or receiver cost function (i.e., $f(s_T)$ or $f(s_R)$) and a specific transmitter or receiver tuning parameter (i.e., $s_{T,1}$, $s_{T,2}$ or $s_R$). In the case that auto-tuner 300 is used to implement auto-tuner 224 of FIG. 2, which minimizes receiver cost function $f(s_R)$, auto-tuner 300 may minimize receiver cost function $f(s_R)$ by maximizing a negative of the cost function $f(s_R)$ (i.e., minimizing $f(s_R)$=maximizing ($-f(s_R)$)).

Tuning parameter s is generated by combiner 308, which adds a sinusoidal perturbation signal $\alpha \cdot \cos(\omega_p t)$ generated by perturbation-signal generator 302 to a signal $s_c$ generated by negative-feedback controller 306 as shown in Equation (5) below:

$$s = s_c + \alpha \cdot \cos(\omega_p t) \tag{5}$$

To initialize signal $s_c$, a slow temporal ramp may be added at combiner 308 that would sweep tuning parameter s over its allowable range. Near the peak of the resonant curve, cost function $f(s)$ would grow large (e.g., be maximized), at which point the ramp may be halted. The value of signal $s_c$ may be initialized to the value of signal $s_c$ when the ramp is halted, and the negative-feedback controller 306 may subsequently take over. Perturbation-signal frequency $\omega_p$ is preferably chosen to be relatively large compared to the reciprocal of the desired response time of automatic tuner 300, but relatively small compared to the operating resonant frequency of the wireless power transfer system. Further, perturbation-signal frequency $\omega_p$ is preferably chosen not to be a multiple of the local-line frequency (e.g., 50 or 60 Hz). Perturbation-signal amplitude $\alpha$ is preferably chosen to be relatively small such that the first-order Taylor series approximation of the resulting cost function as shown in Equation (6) is valid:

$$f(s_c + a \cdot \cos(\omega_p t)) \approx f(s_c) + a \cdot \cos(\omega_p t) \cdot \frac{df}{ds}\bigg|_{s=s_c} \tag{6}$$

Phase-sensitive detector 304 extracts the derivative $df/ds$ of cost function $f(s)$. In particular, phase-sensitive detector 304 multiplies cost function $f(s)$ by $\cos(\omega_p t)$ and low-pass filters the resulting product, which may be represented as follows:

$$f(s_c + a \cdot \cos(\omega_p t)) \cdot \cos(\omega_p t) \approx \tag{7}$$
$$f(s_c) \cdot \cos(\omega_p t) + a \cdot \cos^2(\omega_p t) \cdot \frac{df}{ds}\bigg|_{s=s_c} =$$
$$f(s_c) \cdot \cos(\omega_p t) + \frac{a}{2} \cdot (1 + \cos(2\omega_p t)) \cdot \frac{df}{ds}\bigg|_{s=s_c}$$

The low-pass filter within phase-sensitive detector 304 retains only the near-DC term in Equation (7)

$$\left( \text{i.e.,} \frac{a}{2} \cdot \frac{df}{ds}\bigg|_{s=s_c} \right).$$

Negative-feedback controller 306 amplifies or attenuates the derivative signal $df/ds$ to drive the derivative signal toward zero and applies a compensation filter that ensures that the entire loop, formed by the resonant circuit, auto-tuner, and power detector is stable. The compensation filter may be chosen based on the dynamics of cost function $f(s)$ and the characteristics of the phase-sensitive detector 304. Compensation filters, such as "lead compensators" and "lag compensators" are well-known in the art of classical control theory. If the derivative d𝑓/ds is positive, implying that tuning parameter s is less than its optimum value, then negative-feedback controller 306 increases (i.e., amplifies) the value of tuning parameter s. Conversely, if the derivative d𝑓/ds is negative, implying that tuning parameter s is greater than its optimum value, then negative-feedback controller 306 decreases (i.e., attenuates) the value of tuning parameter s. Equilibrium is achieved when the derivative d_71/ds is equal to zero. At this point, cost function 𝑓(s) is maximized.

FIG. 4 shows a simplified flow diagram for a digital automatic tuner 400 according to one embodiment of the present invention that may be used to implement automatic tuners 214 and 224 in FIG. 2. Similar to auto-tuner 300 of FIG. 3, auto-tuner 400 generates a perturbation signal (step 402). However, rather than generating a sinusoidal perturbation signal $\alpha \cdot \cos(\omega_p t)$, auto-tuner 400 generates a low-amplitude ramp of duration $T_p$ as shown in Equation (8) below:

$$\frac{a}{T_p} \cdot t, \; -\frac{T_p}{2} \le t \le \frac{T_p}{2} \quad (8)$$

This low-amplitude ramp is combined with a signal $s_c$ to generate tuning parameter s as follows:

$$s = s_c + \frac{a}{T_p} \cdot t \quad (9)$$

Signal $s_c$ may be initialized by applying a temporal ramp that sweeps tuning parameter s over its allowable range. Near the peak of the resonant curve, cost function 𝑓(s) would grow large (e.g., be maximized), at which point the ramp may be halted. Then, the low-amplitude ramp generated by auto-tuner 400 could be centered about the value of tuning parameter s when the ramp is halted.

A computing device (e.g., power detector 216 and 226) generates (step 404) the cost function $$f\left(s_c + \frac{a}{T_p} \cdot t\right),$$

which may be averaged over a multiplicity of ramps to reduce effects of noise. If the computing device finds that the cost function is maximized between $$s_c - \frac{a}{2} \text{ and } s_c + \frac{a}{2},$$

then the computing device adjusts signal $s_c$ to the value at which the cost function is maximized (action 406) This process is then repeated (e.g., a new ramp is applied that is centered around the new value of the tuning parameter). If the computing device finds that the cost function is maximized at the end-point $$s_c + \frac{a}{2},$$

then the computing device (i) increases signal $s_c$ by an amount less than or equal to α (action 406) and (ii) repeats actions 402 to 406 using the increased signal $s_c$. If, on the other hand, the computing device finds that the cost function is maximized at the end-point $$s_c - \frac{a}{2},$$

then the computing device (i) decreases signal $s_c$ by an amount less than or equal to α and (ii) repeats actions 402 to 406 using the decreased signal $s_c$.

Although the present invention was described relative to the specific embodiment in FIG. 2, the present invention is not so limited. For example, various embodiments of the present invention may implement one auto-tuner at either the transmitter or receiver but not both. In the case that one auto-tuner is implemented at the transmitter, the one auto-tuner may generate a tuning parameter for (i) signal generator 206, (ii) transmitting resonant circuit 210, or (iii) both signal generator 206 and transmitting resonant circuit 210.

As another example, wireless power transmitter 202 may implement a wireless communications transmitter to communicate a cost function generated by power detector 216 and/or a tuning parameter generated by auto-tuner 214 to wireless power receiver 204, which may implement a wireless communications receiver to receive the cost function and/or tuning parameter. Wireless power receiver 204 may then (i) use the cost function to generate a tuning parameter (e.g., using auto-tuner 214) for tuning receiving resonant circuit 218 and/or (ii) use the received tuning parameter to tune receiving resonant circuit 218.

Similarly, wireless power receiver 204 may implement a wireless communications transmitter to communicate a cost function generated by power detector 226 and/or a tuning parameter generated by auto-tuner 224 to wireless power transmitter 202, which may implement a wireless communications receiver to receive the cost function and/or tuning parameter. Wireless power transmitter 202 may then (i) use the cost function to generate a tuning parameter for adjusting the frequency of signal generator 206 and/or tuning the frequency of transmitting resonant circuit 210, and/or (ii) use the received tuning parameter for adjusting the frequency of signal generator 206 and/or tuning the frequency of transmitting resonant circuit 210.

Further, according to various embodiments of the present invention, the signal $f(s_T)$ provided by power detector 216 may be digitized. In such embodiments, auto-tuner 214 may be implemented having a digital phase-sensitive detector (e.g., 304), a digital negative-feedback controller (e.g., 306), and a digital-to-analog converter that converts the transmitter tuning parameter ($s_{T,1}$, $s_{T,2}$) from digital format to analog format. Similarly, according to various embodiments, the signal $f(s_R)$ provided by power detector 226 may be digitized. In such embodiments, auto-tuner 224 may be implemented having a digital phase-sensitive detector (e.g., 304), a digital negative-feedback controller (e.g., 306), and a digital-to-analog converter that converts the receiver tuning parameter $s_R$ from digital format to analog format.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A device for a wireless power transfer system, the system having a wireless power transmitter (TX) and a wireless power receiver (RX), wherein:
    the wireless power transmitter comprises:
        a TX resonant circuit that resonates at a TX resonant frequency; and
        a signal generator that applies a generator signal having a generator frequency to the TX resonant circuit;
    the wireless power receiver comprises an RX resonant circuit that resonates at an RX resonant frequency;
    at least one of the wireless power transmitter and the wireless power receiver comprises a power detector that measures power in the corresponding resonant circuit;
    at least one of the wireless power transmitter and the wireless power receiver comprises an auto-tuner that generates at least one tuning parameter based on the measured power, wherein the auto-tuner comprises:
        a perturbation signal generator that generates a perturbation signal;
        a phase-sensitive detector that receives a cost-function signal generated by the power detector based on the measured power and the perturbation signal and generates a filtered signal;
        a negative-feedback controller that modifies the filtered signal to generate a modified signal; and
        a summation node that combines the perturbation signal and the modified signal to generate the at least one tuning parameter;
    the at least one tuning parameter is used to adjust at least one of the generator frequency, the TX resonant frequency, and the RX resonant frequency;
    the device is one of the wireless power transmitter and the wireless power receiver; and
    the device comprises at least one of the power detector and the auto-tuner.

2. The invention of claim 1, wherein:
    the device is the wireless power transmitter;
    the wireless power receiver comprises the auto-tuner;
    the device comprises the power detector, which measures reflected power in the TX resonant circuit; and
    the auto-tuner generates the at least one tuning parameter to minimize the reflected power.

3. The invention of claim 1, wherein:
    the device is the wireless power transmitter;
    the device comprises the auto-tuner;
    the device comprises the power detector, which measures reflected power in the TX resonant circuit; and
    the auto-tuner generates the at least one tuning parameter to minimize the reflected power.

4. The invention of claim 3, wherein the at least one tuning parameter comprises:
    a first tuning parameter that adjusts the generator frequency; and
    a second tuning parameter that adjusts the TX resonant frequency by controlling capacitance of a variable capacitor in the TX resonant circuit.

5. The invention of claim 1, wherein:
    the device is the wireless power transmitter;
    the device comprises the auto-tuner;
    the wireless power receiver comprises the power detector, which measures received power in the RX resonant circuit; and
    the auto-tuner generates the at least one tuning parameter to maximize the received power.

6. The invention of claim 1, wherein:
    the device is the wireless power receiver;
    the wireless power transmitter comprises the auto-tuner; and
    the device comprises the power detector, which measures received power in the RX resonant circuit; and
    the auto-tuner generates the at least one tuning parameter to maximize the received power.

7. The invention of claim 1, wherein:
    the device is the wireless power receiver;
    the device comprises the auto-tuner;
    the device comprises the power detector, which measures received power in the RX resonant circuit; and the auto-tuner generates the at least one tuning parameter to maximize the received power.

8. The invention of claim 7, wherein the at least one tuning parameter adjusts the RX resonant frequency by controlling capacitance of a variable capacitor in the RX resonant circuit.

9. The invention of claim 1, wherein:
the device is the wireless power receiver;
the device comprises the auto-tuner;
the wireless power transmitter comprises the power detector, which measures reflected power in the TX resonant circuit; and
the auto-tuner generates the at least one tuning parameter to minimize the reflected power.

10. The invention of claim 1, wherein the at least one tuning parameter generated by the auto-tuner adjusts the generator frequency.

11. The invention of claim 1, wherein the at least one tuning parameter generated by the auto-tuner adjusts the TX resonant frequency.

12. The invention of claim 11, wherein:
the TX resonant circuit comprises a variable capacitor; and
the at least one tuning parameter adjusts capacitance of the variable capacitor.

13. The invention of claim 1, wherein the at least one tuning parameter generated by the auto-tuner adjusts the RX resonant frequency.

14. The invention of claim 13, wherein:
the RX resonant circuit comprises a variable capacitor; and
the at least one tuning parameter adjusts capacitance of the variable capacitor.

15. The invention of claim 1, wherein the generator frequency, the TX resonant frequency, and the RX resonant frequency are RF frequencies.

16. The invention of claim 1, wherein the auto-tuner generates the at least tuning parameter to make the generator frequency, the TX resonant frequency, and the RX resonant frequency substantially equal to one another.

17. The invention of claim 1, wherein the phase-sensitive detector generates a derivative of the cost function as the filtered signal; and
the negative-feedback controller adjusts the filtered signal to drive the derivative towards zero.

18. The invention of claim 1, wherein the auto-tuner:
(i) applies a perturbation ramp to the at least one tuning parameter to generate a perturbed cost-function signal;
(ii) measures the perturbed cost-function signal; and
(iii) generates the at least one tuning parameter by optimizing the measured perturbed cost-function signal.

19. A wireless power transfer system comprising a wireless power transmitter (TX) and a wireless power receiver (RX), wherein:
the wireless power transmitter comprises:
a TX resonant circuit that resonates at a TX resonant frequency; and
a signal generator that applies a generator signal having a generator frequency to the TX resonant circuit;
the wireless power receiver comprises an RX resonant circuit that resonates at an RX resonant frequency;
at least one of the wireless power transmitter and the wireless power receiver comprises a power detector that measures power in the corresponding resonant circuit;
at least one of the wireless power transmitter and the wireless power receiver comprises an auto-tuner that generates at least one tuning based on the measured power, wherein the auto-tuner comprises:
a perturbation signal generator that generates a perturbation signal;
a phase-sensitive detector that receives a cost-function signal generated by the power detector based on the measured power and the perturbation signal and generates a filtered signal;
a negative-feedback controller that modifies the filtered signal to generate a modified signal; and
a summation node that combines the perturbation signal and the modified signal to generate the at least one tuning parameter; and
the at least one tuning parameter is used to adjust at least one of the generator frequency, the TX resonant frequency, and the RX resonant frequency.

20. The invention of claim 19, wherein the wireless power transmitter and the wireless power receiver are separated by at least about two meters.

21. The invention of claim 19, wherein:
the wireless power transmitter comprises:
a first power detector that detects reflected power at the TX resonant circuit; and
a first auto-tuner that generates, to minimize the reflected power, (i) a first tuning parameter that adjusts the generator frequency and (ii) a second tuning parameter that adjusts the TX resonant frequency by controlling capacitance of a TX variable capacitor in the TX resonant circuit; and
the wireless power receiver comprises:
a second power detector that detects power output by the RX resonant circuit; and
a second auto-tuner that generates, to maximize the output power, a third tuning parameter that adjusts the RX resonant frequency by controlling capacitance of an RX variable capacitor in the RX resonant circuit.

22. A method for tuning a device in a wireless power transfer system, the system having a wireless power transmitter (TX) and a wireless power receiver (RX), wherein:
the wireless power transmitter comprises:
a TX resonant circuit that resonates at a TX resonant frequency; and
a signal generator that applies a generator signal having a generator frequency to the TX resonant circuit;
the wireless power receiver comprises an RX resonant circuit that resonates at an RX resonant frequency; and
the method comprises:
(a) detecting power in at least one of the wireless power transmitter and the wireless power receiver;
(b) generating at least one tuning parameter based on the measured power, wherein step (b) comprises:
(b1) generating a perturbation signal;
(b2) receiving a cost-function signal generated based on the measured power and the perturbation signal, and generating a filtered signal;
(b3) modifying the filtered signal to generate a modified signal; and
(b4) combining the perturbation signal and the modified signal to generate the at least one tuning parameter; and
(c) adjusting at least one of the generator frequency, the TX resonant frequency, and the RX resonant frequency based on the at least one tuning parameter.

23. A device for a wireless power transfer system, the system having a wireless power transmitter (TX) and a wireless power receiver (RX), wherein:
the wireless power transmitter comprises:
a TX resonant circuit that resonates at a TX resonant frequency; and
a signal generator that applies a generator signal having a generator frequency to the TX resonant circuit;

the wireless power receiver comprises an RX resonant circuit that resonates at an RX resonant frequency;

at least one of the wireless power transmitter and the wireless power receiver comprises a power detector that measures power in the corresponding resonant circuit;

at least one of the wireless power transmitter and the wireless power receiver comprises an auto-tuner that generates at least one tuning parameter based on the measured power, wherein the auto-tuner:

(i) applies a perturbation ramp to the at least one tuning parameter to generate a perturbed cost-function signal;

(ii) measures the perturbed cost-function signal; and (iii) generates the at least one tuning parameter by optimizing the measured perturbed cost-function signal;

the at least one tuning parameter is used to adjust at least one of the generator frequency, the TX resonant frequency, and the RX resonant frequency;

the device is one of the wireless power transmitter and the wireless power receiver; and the device comprises at least one of the power detector and the auto-tuner.

* * * * *